United States Patent Office 2,863,860
Patented Dec. 9, 1958

2,863,860

NEW MONOAZO COMPOUNDS

John Mitchell and Harry James Twitchett, Manchester, England, assignors to Imperial Chemical Industries Limited, London, England, a corporation of Great Britain No Drawing. Application June 26, 1956
Serial No. 593,790

Claims priority, application Great Britain June 29, 1955

6 Claims. (Cl. 260—193)

This invention relates to new monoazo compounds having valuable ultraviolet light absorption properties and to the manufacture thereof.

The deleterious effect of light, in particular of ultraviolet light, on organic materials is well known. It is responsible for fading of many dyestuffs and pigments and is one of the causes of embrittlement, discoloration, loss of tensile strength and impairment of electrical properties of synthetic polymers and of natural products such as cellulose, wood and rubber. Ultraviolet radiation also causes deterioration of food, particularly of fats, which develop rancidity. Radiation of approximate wavelength 295–310 millimicrons causes erytherma.

The use of ultraviolet absorbing compounds to mitigate the effect of light is well known any many compounds have been proposed for application in a variety of media including synthetic polymers, natural and synthetic fibres, coating compositions and varnishes, wrapping materials, cosmetics and photographic film, filters, etc.

The hitherto described compounds have been found to be not entirely satisfactory owing, for example, to insufficient ultraviolet light absorption, undesirable visible light absorption, insufficient stability of the compounds or incompatibility with the medium in or on which they are to be employed. Some of the compounds suggested for use are strongly fluorescent and for some purposes this property is undesirable.

We have now discovered a class of compounds which are outstandingly free from these defects.

Thus according to the present invention we provide new monoazo compounds of the formula

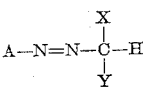

wherein A stands for a benzene nucleus carrying at least one —SO$_2$NRR' substituent, wherein R and R' stand for hydrogen, alkyl, cycloalkyl, aryl or aralkyl, the same or different, and optionally carrying also at least one other negative substituent, and X and Y stand for —CN, —COCH$_3$, —CONH$_2$ or —COO(alkyl up to 4 carbon atoms) groups, the same or different.

As examples of negative substituents which may be present in the benzene nucleus, A, we mention —Cl, —Br, —CN, —CF$_3$, —SO$_3$H, —COOH, —CO.C$_6$H$_5$, —SO$_2$Alkyl, —COOAlkyl, —CONRR' wherein R and R' stand for hydrogen, alkyl, cycloalkyl, aryl and aralkyl and may be the same or different.

A lower alkyl group may also be present in the benzene nucleus, A, provided at least one negative substituent as described above is present at the same time.

The new monoazo compounds may be prepared by conventional methods for preparing azo compounds, using as starting materials an aromatic amine of the formula A—NH$_2$, wherein A has the significance stated above, and a coupling component of the general formula:

As examples of aromatic amines of the formula A—NH$_2$ there may be mentioned: 3-aminobenzenesulphonamide, 4-aminobenzenesulphon-N-methylanilide, 3-amino-4-carboxybenzene-N-sulphondiethylamide, 3-aminobenzenesulphon-N-dimethylamide, sulphanilamide, As examples of coupling components of the formula

there may be mentioned acetylacetone, acetoacetamide, malondinitrile and alkyl esters of acetoacetic, malonic or cyanacetic acids.

The new monoazo compounds are of good fastness to light and continue to absorb ultraviolet light for a long period of time. They possess physical properties which render them suitable for incorporation into, and make them compatible with, a wide variety of media where it is desired to absorb ultraviolet light in order to mitigate its normally deleterious influence.

The absorption spectra of the compounds are such that while there is strong absorption in the region of 350–370 millimicrons, absorption at 400 millimicrons and above in the visible portion of the spectrum is low and the compounds may therefore be incorporated in many media, which may be coloured, without introducing marked visual effects or distorting colour balance unduly.

The invention is illustrated but not limited by the following examples in which parts are by weight.

Example 1

17.2 parts of 3-aminobenzenesulphonamide are dissolved in a mixture of 200 parts of water and 100 parts of 10 N hydrochloric acid. Ice is added to reduce the temperature to below 5° C. and 50 parts of 2 N sodium nitrite solution are then added in ½ minute. The diazo solution so obtained is stirred for ½ hour and 1 part of decolourising carbon is then added. The suspension is stirred for 5 minutes and filtered. To the filtrate are added 80 parts of sodium acetate crystals followed by 15 parts of ethyl cyanoacetate. Coupling is completed by stirring for 16–20 hours. The suspension is filtered and the product is washed with water and dried at 50° C.

The product forms pale yellow crystals, melting point 195–6° C., from glacial acetic acid and may be represented by the formula:

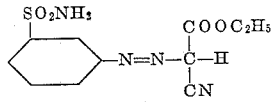

Example 2

26.2 parts of 4-aminobenzenesulphon-N-methylanilide are dissolved in a mixture of 200 parts of water and 25 parts of 10 N hydrochloric acid. The solution is cooled with ice to 0–5° C. 50 parts of 2 N sodium nitrite solution are added in ½ minute. The diazo solution so obtained is stirred for 1 hour and 1 part of decolourising carbon is then added. The mixture is filtered and to the filtrate are added 40 parts of sodium acetate crystals followed by 20 parts of diethyl malonate. The mixture is stirred for 16 hours at room temperature and the azo compound so obtained is filtered, washed with cold water, and dried at 50° C.

The product is a creamy powder, melting point 90–92° C. and may be represented by the formula:

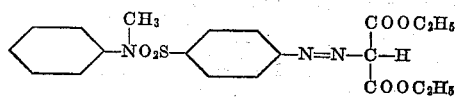

The products of the above examples are soluble in many organic solvents. They may be incorporated in a wide variety of media where it is desired to absorb ultraviolet light and mitigate its otherwise deleterious influence.

They may be incorporated, for example, in varnishes and lacquers, composed of film forming plastic materials or polymers, in wrapping materials of either natural or synthetic origin, and in polymeric sheet material where it is desired to protect underlying material or articles from the deleterious influence of ultraviolet light.

The spectra of the products of the above examples possess a peak of maximum absorption in the ultraviolet and although they absorb some light at 400 millimicrons, which is often taken to be the threshold of visible light, absorption below this wavelength rises sufficiently sharply to make these weakly coloured products of considerable value as ultraviolet absorbing agents.

Peaks of maximum absorption in the ultraviolet are illustrated in the following table:

| Diazo Component | Coupling Component | Wavelength of maximum absorption, millimicrons |
|---|---|---|
| 3-aminobenzenesulphonamide | acetylacetone | 362. |
| 4-aminobenzenesulphonamide | do | 368. |
| 4-amino-3-carboxybenzene-N-methylanilide | do | 365. |
| 3-aminobenzenesulphonamide | methyl cyanacetate | 355. |
| 3-amino-4-carboxybenzene-sulphonamide | ethyl cyanacetate | 360. |
| 4-aminobenzenesulphonamide | do | 355. |
| 3-aminobenzenesulphonamide | do | 355. |
| Do | n-butyl cyanacetate | 358. |
| Do | dimethyl malonate | greater than 350. |
| Do | diethylmalonate | Do. |
| Do | methylacetoacetate | 353. |
| Do | ethylacetoacetate | 353. |
| 4-aminobenzenesulphonamide | diethyl malonate | greater than 350. |
| 4-aminobenzenesulphon-N-cyclohexylamide | do | 353. |
| 3-aminobenzenesulphonanilide | ethyl cyanacetate | 350. |
| 4-aminobenzenesulphon-N-cyclohexylamide | do | 360. |
| 3-aminobenzenesulphon-N-dimethylamide | do | greater than 350. |
| 3-aminobenzenesulphon-N-methylanilide | do | 353. |
| 4-aminobenzenesulphon-N-methylanilide | do | 365. |
| Do | diethyl malonate | 350. |
| 4-amino-3-carboxybenzene-sulphon-N-methylanilide | ethyl cyanacetate | 362. |
| Do | diethyl malonate | 355. |
| 4-aminobenzenesulphon-N-di(hydroxyethyl)amide | ethyl cyanacetate | 358. |
| 3-aminobenzenesulphonamide | malondinitrile | 357. |

As illustrative of the compounds listed above, the product ethyl-4-sulphonamidophenylazocyanacetate which is obtained when the diazo component is 4-amino-benzenesulphonamide and the coupling component is ethyl cyanoacetate, may be represented by the formula:

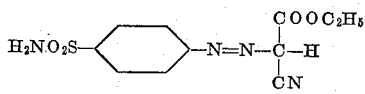

The product obtained using 4-amino-benzenesulphonamide and diethyl malonate may be represented as follows:

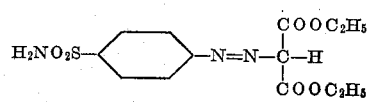

and the product of 4-amino-benzenesulphon-N-cyclohexylamide and ethyl cyanacetate may be shown as:

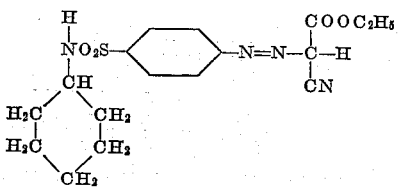

The products show relatively good stability to heat, insofar as they are subjected to elevated temperatures in the applications described above. They are not degraded by light to coloured decompostion products and possess other valuable properties.

What we claim is:

1. A monoazo compound selected from the group consisting of compounds having the formula

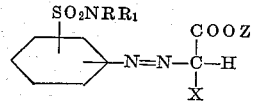

and compounds having the formula

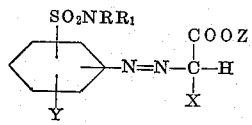

wherein Y is a carboxylic acid substituent, R is selected from the group consisting of hydrogen, methyl, ethyl and hydroxyethyl and $R_1$ is selected from the group consisting of hydrogen, methyl, ethyl, hydroxyethyl, cyclohexyl and phenyl, and X is selected from the group consisting of —COOZ and —CN where Z is an alkyl group containing 1 to 4 carbon atoms.

2. The monoazo compound, ethyl-4-sulphonamido-phenylazocyanacetate, said compound having the formula:

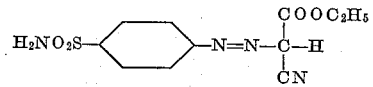

3. A monoazo compound having the formula:

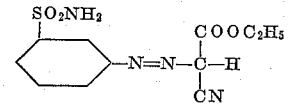

4. A monoazo compound having the formula:

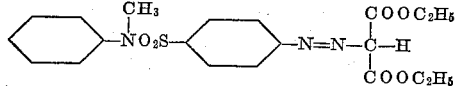

5. A monoazo compound having the formula:

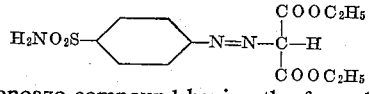

6. A monoazo compound having the formula:

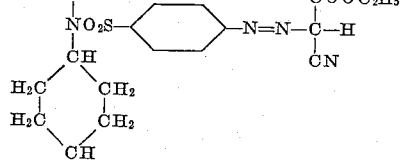

References Cited in the file of this patent

UNITED STATES PATENTS

| 818,981 | Scholl | Apr. 24, 1906 |
| 2,734,895 | Zickendraht et al. | Feb. 14, 1956 |

OTHER REFERENCES

Mossini: Chem. Abst., vol. 34, page 2175 (1940).